United States Patent Office 3,021,256
Patented Feb. 13, 1962

3,021,256
INDUSTRIAL PROCESS WATER TREATMENT
Carol H. Bollenback, Palos Park, George R. Hunt, La Grange, and Jerry J. Svarz, Joliet, Ill., assignors to Nalco Chemical Company, a corporation of Delaware
No Drawing. Filed June 2, 1958, Ser. No. 738,918
13 Claims. (Cl. 162—161)

The present invention relates to a process for chemically treating aqueous fluids used in various industrial processes for the purpose of controlling the growth and reproduction of microorganisms. More specifically, the invention is directed to a new class of microbiocidal agents which afford excellent bacteriological control in the paper making processes and are not rendered inactive due to the absorptive properties of cellulose fibers.

The growth of microorganisms in industrial process waters is a problem which occurs in many industries using large quantities of aqueous fluids. The problem occurs in such industrial systems as cooling towers, paper mills, the secondary recovery of petroleum in the process known as water flooding, water wells, and similarly related industrial fluid systems. Most industrial systems of these types obtain their water supplies from many varied sources and due to economic considerations, it is customary to recirculate and reuse the water. This tends to produce an environment favorable towards the culture and spread of undesirable microorganisms such as the various species of bacteria and fungi.

One of the most acute bacteriological control problems is found in the production of paper. Microbiological slime masses which form in the various parts of the paper making system are recognized as one of the reasons for decreased production, breaks occurring on the machines, and the occurrence of spots and holes in paper. Unless these slime masses are controlled, production is decreased and maintenance costs become excessive.

In order to curtail microbiological phenomena from occurring, it is today a common practice to use chemical treatment to control and mitigate growth of microorganisms which tend to form slimes in the various parts of the paper making plants. Investigations of the slime-forming microorganisms have disclosed that numerous varieties of bacteria and fungi are the source of the problem, and it is often necessary to control these organisms by using several different types of microbiocidal agents. It would be extremely advantageous if a single chemical treatment were available which would be able to control the several species of microorganisms commonly occurring in paper mill manufacturing processes whereby these detrimental slime-forming organisms would be controlled or reduced.

Another aspect of the problem of controlling microorganisms in the paper manufacturing industry is that the water used in the paper making process contains quantities of cellulosic materials which vary in concentration from about 0.1%, of which white water is exemplary, all the way up to 15% by weight, which concentrations are fairly common in pulp storage tanks. Many chemical microbiocidal agents have the tendency to be selectively absorbed by the fiber, which means they are no longer capable of effectively acting upon the slime masses. To be really effective in the control of microorganisms in paper mills, it is extremely desirable that a chemical is able to control the growth of a number of species of harmful microorganisms but also that such agent should not tend to be absorbed on cellulose fibers.

Another specialized and extremely difficult industrial problem is the control of microorganisms of the sulphate reducing bacteria type, which problem is associated with the process known as water flooding. For a more complete understanding of the invention, a brief description of the water flooding process is given below.

When an oil well ceases to flow by the natural pressure in the formation and/or substantial quantities of oil can no longer be obtained by the usual pumping methods, various processes are sometimes used for the treatment of the oil bearing formation in order to increase the flow of oil. These processes are usually described as secondary recovery processes. One such process which is frequently used is the water flooding process wherein water is pumped under pressure into what is called an "injection well," and oil along with quantities of water that have been displaced from the formation are pumped out of an adjacent well which is referred to as a "producing well." The produced oil is then separated from the water that has also been pumped from the producing well. The reclaimed water is then pumped to a storage reservoir from which it can be fed into the injection well. Supplementary water from other sources may also be used in conjunction with the produced water. When the storage reservoir is opened to the atmosphere, and the oil is subject to aeration, this type of water flooding system is referred to as an "open water flooding system." If the water is recirculated in a closed system without substantial aeration, the secondary recovery method is frequently referred to as a "closed water flooding system."

The water which is introduced into the injection wells may vary considerably in composition from one field to another. Frequently it contains relatively large quantities of dissolved salts such as sodium chloride and, therefore, can be described as a brine. It may also contain other salts such as those of calcium, magnesium, barium, and strontium. Some iron salts may also be present. In some cases these salts are added to fresh water to prevent clay minerals from swelling and to seal porous oil sands, but in most cases, their occurrence is natural.

In the last few years there have been several commercially available bactericidal preparations sold for the specific purpose of controlling sulphate reducing bacteria in water flood operations. These preparations have met with varying measures of success, but they have not been found adequate in controlling sulphate reducing bacteria when the brine content of the injection fluid is relatively high. These high brine water flood liquids usually contain at least 3% or more of dissolved salts and usually will contain from 10% to 30% by weight of dissolved salts and for some unknown reason these high concentrations of inorganic salts tend to render ineffectual many of the well-known microbiocides which are effective in controlling sulphate reducing bacteria under less saline conditions.

Similar conditions exist in many other industrial systems where water tends to flow and is subject to constant environmental change. pH variations, dissolved solid contents, and environmental adaptation of microorganisms tend to make the control of microorganisms extremely difficult in many industrial systems. Many commercially available microbiocides, while being somewhat effective in systems such as are described above, have the disadvantage of being soluble only by careful pH control.

It would be extremely desirable if a microbiocidal agent were available which would adequately control microorganisms of the type commonly occurring in the aqueous systems such as paper mills, water floods, cooling towers, and the like and also would be relatively economical to produce and use. Another advantage would be a chemical microbiocidal agent which would be effective at extremely low dosages. It, therefore, becomes an object of the invention to provide a new and improved class of microbiocides which are useful in the control of various species of microorganisms of the types commonly found in industrial process water systems.

Another object is to furnish new chemical microbiocidal agents which are effective in controlling a large number of microbiological species at low, economical dosages.

A specific object is to provide a new class of microbiocidal agents which are effective in controlling the growth and reproduction of microorganisms of the type often found in paper mills and are not subject to sorption by cellulose fibers.

Another specific object is to provide a microbiocidal agent useful in controlling sulphate-reducing bacteria in water flooding operations, particularly in the presence of high brines. Other objects will appear hereinafter.

In accordance with the invention, it has been found that the growth and reproduction of microorganisms of the type commonly found in industrial process waters may be controlled by treating said waters with a small, yet active, amount of a halogenated ketone which contains more than three carbon atoms but less than eighteen carbon atoms in its molecular configuration. Halogenated ketones of this type may be represented by the general formula:

FORMULA I

In the above formula R and R' represent a wide variety of organic radicals such as alkyl, aryl, alkaryl, and aralkyl. In addition to being composed exclusively of hydrocarbons, R and R' may also be composed of one or more heterocyclic rings which may contain such elements as oxygen, sulfur, or similar nonhydrocarbon members. In accordance with the broad concept previously expressed, the total number of carbon atoms contained in R and R' will be in excess of two carbon atoms but less than seventeen. The number of halogen atoms that are necessary to give the ketone microbiological activity is not particularly critical, although from one to three halogen atoms are preferred with amounts in excess of this number being relatively unnecessary in terms of effectiveness. It is also preferred that the halogen substituent be near the carbonyl portion of the molecule and is not part of an aromatic grouping.

A specific group of halogenated ketones of the type with which this invention is concerned are illustrated by General Formula II below:

FORMULA II

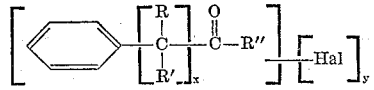

This particular type of halogenated ketone is an aryl- or aralkyl-substituted ketone which, for some unknown reason, gives somewhat superior results in the control of microorganisms over and above the results obtained using other halogenated ketones. In Formula II, R and R' may be selected from such groups as hydrogen, halogen or methyl groups, and R'' is a lower alkyl group which usually will have from one to three carbon atoms in chain length, and $x$ and $y$ are integers having various values ranging from zero to three. The best results are frequently obtained when the number of carbon atoms contained in R, R' and R'' does not exceed ten. For purposes of illustration, the halogen portion of the molecule, Hal, has been depicted as being a generally-occurring substituent as to the entirety of the molecule, although in a preferred embodiment, it is desirable to have the halogen substituted at the R or R' position.

Commercial expediency dictates that the halogenated ketone of the invention will be a chloro-ketone, although the bromo- and iodo-ketones work equally well. The amount of halogenated ketone necessary to achieve control of microorganisms will, of course, vary depending upon the particular system treated, as well as the types of species found present. In most cases, however, as little as one-half part per million to 25 parts per million will give adequate control, although quantities ranging as high as 500 parts per million may be necessary in some cases. Small quantities of the chemical are extremely effective in industrial process systems where the water is recirculated and reused, which means that the quantity of the chemical will gradually build up to a maximum usable and effective treating dosage, which may be calculated knowing the specific factors in each particular system.

Most of the halogenated ketones, particularly the halogenated ketones containing aromatic nuclei, are not particularly soluble in water, and it is necessary to further formulate the materials where concentrated water dispersible products are desired. The most expeditious manner of formulating these chemicals is to dissolve or suspend the halogenated ketone into a hydrocarbon liquid solvent and to add sufficient amounts of an emulsifying agent whereby aqueous emulsions may be prepared. Thus, for instance concentrated solutions or suspensions containing from five to twenty percent by weight of the halogenated ketones containing aromatic groups may be made using such solvents as xylene, toluene, or petroleum aromatic solvent type oils and adding to such solvents from 0.5 to 3% by weight of a suitable emulsifier, such as $C_6$–$C_{22}$ alkenyl succinic anhydrides or their alkali metal salts or such materials as ethoxylated and/or propoxylated fatty-substituted amines which contain from three to fifteen moles of ethylene oxide. In the case of primarily aliphatic halogenated ketones, aliphatic hydrocarbon solvents with emulsifiers would be used.

The materials of the invention are quite frequently soluble at use concentrations in industrial process water systems so that chemical briquette absorbents as soda ash, dextrine, and the like, may be used to prepare solid materials which may be fed using conventional briquette feeding equipment.

EVALUATION OF INVENTION

In order to determine the efficacy of the invention for treating various types of industrial process water under a wide variety of conditions, two test methods were used. These test methods correlate with conditions existing in many industrial process systems where microbiological problems occur. These test methods are set forth in detail below:

*Test Method I*

In this test the culture medium used consisted of 24 grams of dextrose, 1 gram of Basaminbact (Anheuser-Busch), added to one liter of Chicago tap water and sterilized by autoclaving under 15 pounds of pressure for 15 minutes. An appropriate amount of 18 to 24 hour nutrient broth culture of *A. aerogenes* or *A. niger* was mixed with 200 ml. of the culture medium immediately before starting tests. The amount of culture was such as to give one million organisms per ml. of medium. Twenty ml. of the inoculated culture medium was placed in each of a series of fermentation tubes with caps which contained the appropriate concentration of stock chemical to avoid more than a 5% error in final dilution. For this purpose the volume of chemical introduced should be one ml. or less. The chemical and the inoculated medium were mixed gently. A control test was also run in which the chemical was omitted. In mixing, each tube was inverted in such a manner as to fill the upright, closed end of the tube with the test liquid. The tubes were incubated at 30° C. for 48 hours. At the end of one hour contact and again after 24 hours' contact, a loopful of the test mixture was withdrawn from each tube and inoculated in a subculture tube containing 10 ml. of sterile nutrient broth. The subculture tubes were incubated at 37° C. for 48 hours and examined for growth. The results of these tests indicated 1 and 24 hour killing ranges. The gas production for inhibition level was recorded at 48 hours for Aerobacter. Growth inhibition was recorded for *A. niger* after five days.

*Test Method II.—Screening inhibition test for sulfate reducing bacteria culture media*

| | |
|---|---|
| Sodium lactate (60%) _____ml__ | 4.0 |
| Yeast extract _____gm__ | 1.0 |
| Ascorbic acid _____gm__ | 0.1 |
| $MgSO_4 \cdot 7H_2O$ _____gm__ | 0.2 |
| $K_2HPO_4$(anhydrous) _____gm__ | 0.1 |
| $Fe(SO_4)_2(NH_4)_2 \cdot 6H_2O$ _____gm__ | 0.1 |
| NaCl _____gm__ | 10.0 |
| Deionized water _____ml__ | 1000.0 |

The ingredients were dissolved by stirring, and the pH was adjusted to 7.2–7.5 with 6 N NaOH. The media was then autoclaved at 15 lb./15 minutes and was ready for use in the test.

The organisms were a culture of sulfate reducers (Desulfovibrio) that were obtained from the American Petroleum Institute and were designated as API-A culture. The inocula for the tests were from the third successive 24-hour transfer, and showed blackening after each 24-hour transfer.

Stock solutions of the bacteriostat to be screened were prepared as 0.9% solutions by weight in ethanol. On the day of the test, 0.09% solutions by volume were prepared in deionized water from the stock solutions and were the working solutions for the tests.

To sterile 18-ml. screw-capped test tubes, sufficient amounts of the chemicals being tested were added to give the desired concentration of bacteriostat in 18 ml. After addition of the chemical, the room temperature media, to which had been added 10 ml. of culture per liter, was poured carefully into the screw-capped tubes to completely fill them, care being taken that no liquid was allowed to overflow from the tubes. Duplicate tubes were prepared in every dilution in addition to a control tube which contains no chemical. The tubes were tightly capped so that air was excluded.

The tubes were incubated at 37° C. for 7 days and then observed for results. Growth of the sulfate reducers was evidenced by intense blackening of the tubes, while inhibition of growth showed no change in appearance.

The desired concentrations of chemicals were obtained in the 18-ml. tubes by adding the following amounts from the 0.09% solutions.

| Concentration (p.p.m.): | Amount of solution, ml. |
|---|---|
| 100 | 2.0 |
| 50 | 1.0 |
| 40 | 0.8 |
| 30 | 0.6 |
| 20 | 0.4 |
| 10 | 0.2 |
| 5 | 0.1 |
| 1 | 0.02 |

With the above-described test methods, several typical compositions of the invention were tested to determine their activity. These results are set forth in Tables I and II.

TABLE I

| Composition Number | Name | Structure | Gas Tube Inhibition Results (p.p.m.) | |
|---|---|---|---|---|
| | | | $Aa$ [1] | $An$ [2] |
| I | 2-chloroacetyl furan | HC—HC, O; C—C—C—$CH_2Cl$ (furan ring with chloroacetyl) | >200 | 25–50 |
| II | 4-chlorobutanone-2 | $CH_3$—C(O)—$CH_2$—$CH_2$—Cl | 100–200 | 50–100 |
| III | 3-chlorobutanone-2 | $CH_3$—C(O)—CHCl—$CH_3$ | 50–100 | 100–200 |
| IV | 1-chlorohexanone-2 | $ClCH_2$—C(O)—$CH_2$—$CH_2$—$CH_2$—$CH_3$ | 10–25 | <10 |
| V | α-chloro-α-phenyl acetophenone | Ph—CHCl—C(O)—Ph | >200 | 10–25 |
| VI | ω-trichloroacetophenone | Ph—C(O)—$CCl_3$ | >200 | 100–200 |
| VII | benzylacetone dichloride | Ph—CHCl—CHCl—C(O)—$CH_3$ | 25–50 | <10 |
| VIII | α-chloro-α-phenyl acetone | Ph—CHCl—C(O)—$CH_3$ | 25–50 | 10–25 |
| IX | α-chloro propiophenone | Ph—C(O)—CHCl—$CH_3$ | 100–200 | <10 |
| X | β-chloro propiophenone | Ph—C(O)—$CH_2$—$CH_2Cl$ | 50–100 | 25–50 |
| XI | p-chlorophenacyl chloride | Cl—Ph—C(O)—$CH_2Cl$ | >10 | <10 |

See footnote at end of table.

TABLE I—Continued

| Composition Number | Name | Structure | Gas Tube Inhibition Results (p.p.m.) | |
|---|---|---|---|---|
| | | | Aa [1] | An [2] |
| XII | p-bromophenacyl bromide | $Br{-}\langle\bigcirc\rangle{-}\overset{O}{\underset{\|}{C}}{-}CH_2Br$ | >10 | <10 |
| XIII | m-chlorophenacyl chloride | $\langle\bigcirc\rangle{-}\overset{O}{\underset{\|}{C}}{-}CH_2Cl$ with Cl | 10–25 | <10 |
| XIV | α-chloroacetophenone | $\overset{O}{\underset{\|}{C}}{-}CH_2Cl$ | 25–50 | >200 |
| XV | 2,4-dichloroacetophenone | $Cl{-}\langle\bigcirc\rangle{-}\overset{}{C}{-}CH_3$ with Cl | >250 | 50–200 |

[1] Aa=Aerobacter aerogenes.
[2] An=Aspergillus niger.

TABLE II.—INHIBITION TESTS AGAINST SULFATE REDUCING BACTERIA

| Comp. No. | Inhibition, 1% Brine | Range (p.p.m.), 10% Brine |
|---|---|---|
| IV | 10–20 | 5–10 |
| XI | 10–20 | 10–20 |

Table I shows the halogenated ketones to be extremely effective in inhibiting the growth of bacteria and fungi. This test strikingly indicates how effective these compositions are for the treatment of paper mill process waters. Such organisms as *Aerobacter aerogenes* and *Aspergillus niger* are frequently found in many paper mill systems; inhibition is accomplished using relatively minor amounts of the halogenated ketones.

Table II indicates the efficacy of the compositions used in the practice of the invention to control sulfate-reducing bacteria in the presence of concentrated brines. It is believed to be well known that most commercial inhibitors are completely ineffective in controlling sulfate-reducing bacteria when such bacteria grows in the presence of brines containing 3% or more of the dissolved solids.

The expressions, "microbiocidal agent" or "microbiocide," as used herein is meant to include the killing and/or inhibiting action of chemical substances on such microorganisms as, for instance, bacteria, fungi, algae, protozoa, and the like.

Having thus described the invention, it is claimed:

1. The method of controlling the growth and reproduction of microorganisms which comprises feeding from .5–500 parts per million of halogenated ketone of the formula:

$$R-\overset{O}{\underset{\|}{C}}-R'$$

where R and R' are from the group consisting of alkyl, aryl, alkaryl, aralkyl, and heterocyclic rings containing, in addition to carbon, one element from the group consisting of oxygen and sulfur, with the proviso that the total number of carbon atoms contained in R and R' is greater than two but less than seventeen, and that there is at least one halogen substituent contained in the molecule, said feeding being from a supply source of said halogenated ketone into an aqueous industrial process system containing bacteria from the group consisting of *Aerobacter aerogenes, Aspergillus niger* and *Desulfovibrio*.

2. The method of claim 1 where the halogenated ketone has the formula:

where R and R' from the group consisting of hydrogen, halogen, and methyl groups, R″ is a lower alkyl group, x is an integer from zero to three, y is an integer from zero to three, and Hal is halogen, with the proviso that the total number of carbon atoms contained in R, R', and R″ and does not exceed ten and that there is at least one occurrence of halogen in the molecule.

3. The method of claim 1 where the halogenated ketone is benzylacetone dichloride.

4. The method of claim 1 where the halogenated ketone is α-chloro-α-phenylacetone.

5. The method of claim 1 where the halogenated ketone is p-chlorophenacyl chloride.

6. The method of claim 1 where the halogenated ketone is m-chlorophenacyl chloride.

7. A suspension comprising water which contains from 0.1% to 15% by weight of suspended cellulose fibers and a biologically-active amount of a halogenated ketone containing more than three carbon atoms but less than eighteen carbon atoms.

8. A suspension comprising water which contains from 0.1% to 15% by weight of suspended cellulose fibers and biologically-active amount of a halogenated ketone of the formula:

$$R-\overset{O}{\underset{\|}{C}}-R'$$

where R and R' from the group consisting of alkyl, aryl, alkaryl, aralkyl, and heterocyclic rings containing, in addition to carbon, one of the elements from the group consisting of oxygen and sulfur with the proviso that the total number of carbon atoms contained in R and R' is greater than two but less than seventeen, and that there is at least one halogen substituent contained in the molecule.

9. The suspension of claim 8 where the halogenated ketone has the formula:

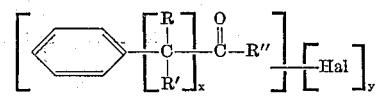

where R and R' are from the group consisting of hydrogen, halogen and methyl groups, R″ is a lower alkyl group, $x$ is an integer from zero to three, $y$ is an integer from zero to three and Hal is halogen with the proviso that the total number of carbon atoms contained in R, R', and R'' does not exceed ten and that there is at least one occurrence of halogen in the molecule.

10. The suspension of claim 8 where the halogenated ketone is benzylacetone dichloride.

11. The suspension of claim 8 where the halogenated ketone is α-chloro-α-phenylacetone.

12. The suspension of claim 8 where the halogenated ketone is p-chlorophenacyl chloride.

13. The suspension of claim 8 where the halogenated ketone is m-chlorophenacyl chloride.

References Cited in the file of this patent

UNITED STATES PATENTS

| | | |
|---|---|---|
| 1,816,441 | Peet | July 28, 1931 |
| 2,338,791 | Weedon | Jan. 11, 1944 |
| 2,684,924 | Rose et al. | July 27, 1954 |
| 2,802,768 | Meuli | Aug. 13, 1957 |
| 2,853,528 | Wojcik | Sept. 23, 1958 |
| 2,901,394 | Rosher | Aug. 25, 1959 |